Patented Feb. 9, 1932

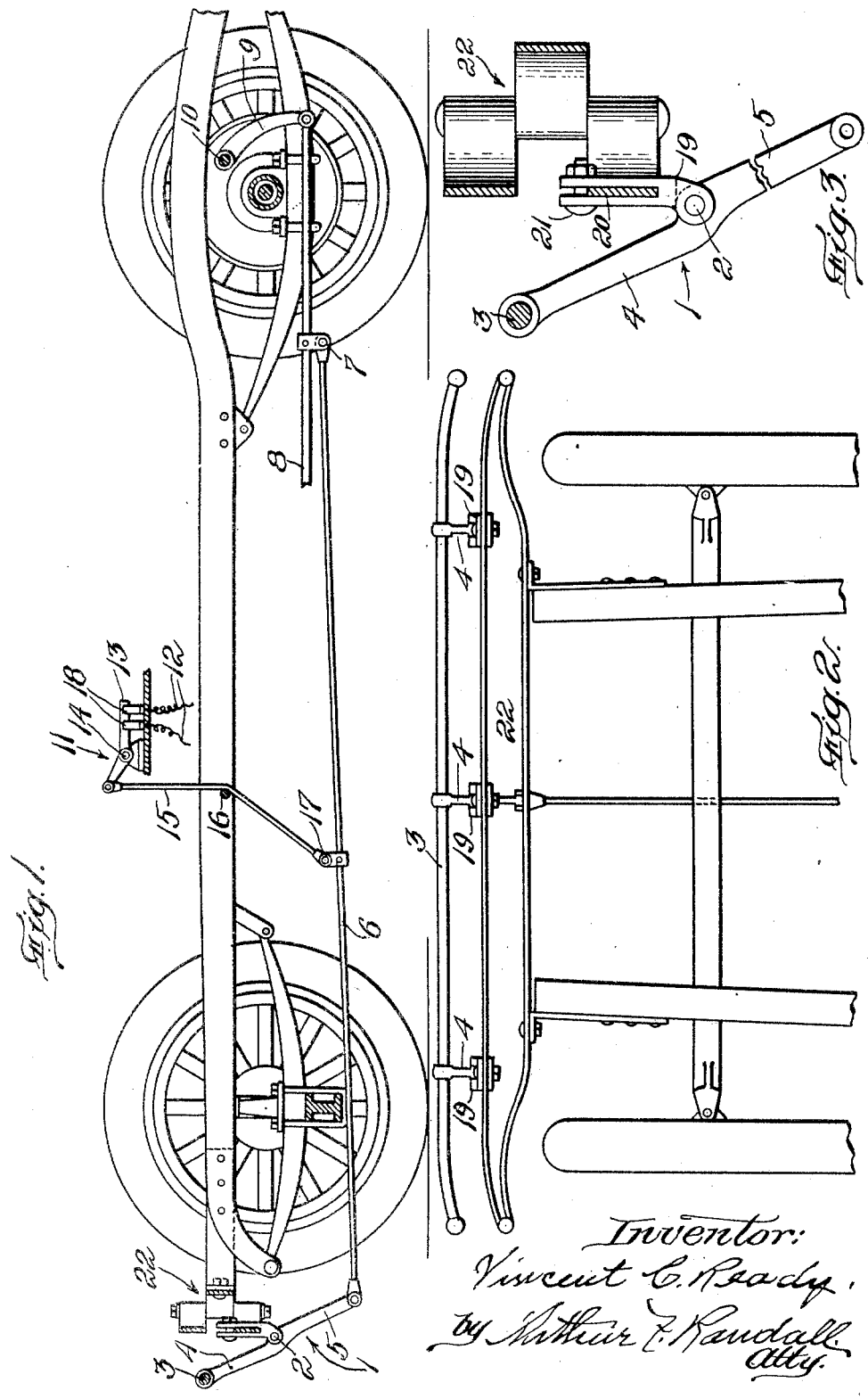

1,844,526

UNITED STATES PATENT OFFICE

VINCENT C. READY, OF MEDFORD, MASSACHUSETTS

STOP MECHANISM FOR AUTOMOBILES

Application filed January 20, 1930. Serial No. 421,970.

My invention relates to stop mechanisms for automobiles and the like and it has for its object to provide an improved mechanism of the class referred to, and in particular to provide a mechanism of this kind which will render the vehicle inoperative in the event that a pedestrian is struck thereby. It is also an object of this invention to provide a stop mechanism attachment which can be applied, at very little expense, to an existing vehicle without requiring alteration or modification thereof.

To these ends I have provided a stop mechanism attachment for automobiles and other motor propelled vehicles having the peculiar features of construction and mode of operation set forth in the following description, the several novel features of the invention being particularly pointed out and defined in the claims at the close thereof.

In the accompanying drawings:—

Figure 1 is a side elevation partly in section of a portion of an automobile equipped with a stop mechanism constructed in accordance with my invention.

Figure 2 is a partial plan view of the front end portion of the vehicle shown in Figure 1.

Fig. 3 is an enlarged detail hereinafter described.

At the present time it is of frequent occurrence that a pedestrian is struck by an automobile and either killed or injured and that the driver of the vehicle does not stop but drives away from the scene of accident without making his identity known.

My invention provides an automatic stop mechanism, preferably embodied in the form of an attachment for existing automobiles and the like, which makes it impossible for a driver to immediately leave the scene of an accident of the kind referred to.

The illustrated embodiment of my invention is an attachment for an automobile, or other motor propelled vehicle, comprising a lever 1 fulcrumed at 2 and provided at its upper end with a cross-bar 3. This lever 1 includes three arms 4 extending upwardly from fulcrums 2 to the cross-bar 3 to which their upper ends are fastened.

One of the arms 4 is made with a depending arm 5 to the lower end of which is connected the forward end of a metal rope or rod 6 whose rear end is fastened at 7 to a connecting rod 8. This connecting rod 8 is connected at its forward end to the usual emergency brake lever, not shown, of the vehicle and at its rear end to a lever 9 extending downwardly from the emergency brake rocker shaft 10. The connecting rod 8, lever arm 9 and rocker shaft 10 are the usual parts of the emergency brake mechanism of the vehicle.

When the emergency brake is not set the arms 4 of the lever 1 occupy forwardly inclined positions as shown in Fig. 1 and it will therefore be clear that when the vehicle is driven against a pedestrian, or other object, the cross-bar 3 will strike the same thereby swinging the lever 1 on its fulcrums 2 in a direction to set the emergency brake.

In order to prevent the operator of the vehicle driving the latter away after unsetting of the emergency brake through the medium of the usual emergency brake lever, not shown, I provide a switch 11 in the main circuit 12 of the ignition system, said switch including a movable blade 13 pivotally supported intermediate its ends at 14 and having one arm thereof connected with the upper end of a wire cable or the like 15. This cable 15 extends downwardly around a roller or sheave 16 and has its lower end connected at 17 to the cable or rod 6.

In the circuit 12 are two fixed switch terminals 18 which are normally bridged by the arm 13 of switch 11. When, however, the lever 1 is operated as described through engagement with a pedestrian, or other object, the resulting forward movement of the cable or rod 6 acts through the cable 15 to open the switch 11 thereby rendering the ignition system of the motor of the vehicle inoperative.

This switch 11 is located in a position on the automobile where it is not conveniently accessible and preferably under the hood so that the driver must descend from the automobile and raise the hood in order to restore the switch 11 to its closed condition.

Thus in the event that the vehicle strikes a pedestrian the emergency brakes are applied and at the same time the ignition system is rendered inoperative in such fashion that the forward movement of the vehicle cannot be resumed until after a considerable period of delay, so that it is impossible for a driver to strike a pedestrian with his vehicle and continue on his way without stopping.

Referring to Fig. 3 it will be seen that each fulcrum 2 is a pintle forming part of a bifurcated bracket 19 that is adapted to receive within it the lower cross-bar 20 of a bumper of ordinary construction, said bracket being clamped fixedly to said bar by means of a bolt 21. In the illustrated embodiment of the invention three brackets 19 are provided, one for each arm 4.

It will thus be seen that the preferred form of my invention is a self-contained attachment for the bumper of an automobile or the like and that no modification or alteration of the vehicle or bumper is required in order to apply the attachment to it.

It is a particular feature of the invention in its preferred form that the lever 1 is attached to the bumper and therefore it is more or less yieldingly backed up by the latter which is desirable. By providing one or more brackets 19 fixedly attached to the lower bar of the bumper 22 each bracket can be made very small and inconspicuous. Furthermore, it is a feature of this form of my invention that each bracket 19 is clamped to the bumper bar without requiring alteration thereof.

It is also a feature of the illustrated embodiment of my invention that when the bar 3 of lever 1 strikes against a body and, together with the arms 4, is swung rearwardly the upper bar of the bumper serves as a yielding stop to limit the rearward movement thereof. Thus the arms 4 and bar 3 can be made comparatively light and inconspicuous.

The above described attachment is of simple and inexpensive construction as well as efficient in its operation.

What I claim is:

1. In an automobile, the combination with a bumper structure of the character described comprising a transverse bumper-bar, of a stop mechanism attachment including a plurality of bracket members embracing said bumper-bar; means for contracting each bracket member thereby to clamp the same fixedly to said bumper-bar; a supplemental bumper member pivotally mounted upon said bracket members and adapted to be swung thereon by engagement with a body with which the vehicle collides; a manually operable and normally closed switch controlling the ignition circuit of the vehicle, and means connecting said switch with said pivotally supported supplemental bumper member through which the latter is operable only to open said switch when swung on said bracket members.

2. An automobile as set forth in claim 1 wherein each bracket member is formed with a slot that is occupied by said transverse bumper-bar and wherein the means for contracting each bracket member thereby to clamp the same fixedly to said bumper-bar consists of a bolt occupying a position alongside of said bumper-bar and extending through the opposite walls of said slot.

3. In an automobile, the combination with a bumper structure of the character described comprising a transverse bumper-bar, of a stop mechanism attachment including a plurality of bracket members embracing said bumper-bar; means for contracting each bracket member thereby to clamp the same fixedly to said bumper-bar; a supplemental bumper member pivotally mounted upon said bracket members and including a body-engaging cross bar, said supplemental bumper member being adapted to be swung on said bracket members by engagement with a body with which the vehicle collides; a manually operable and normally closed switch controlling the ignition circuit of the vehicle; a flexible cable connecting said switch with said pivotally supported supplemental bumper member through which the cable is operable only to open said switch when the supplemental bumper is swung on said bracket members; a brake operating member, and a flexible cable connecting said brake operating member with said supplemental bumper member.

Signed by me at Boston, Suffolk County, Massachusetts, this 31st day of December, 1929.

VINCENT C. READY.